United States Patent
Watanabe et al.

(10) Patent No.: US 9,108,509 B2
(45) Date of Patent: Aug. 18, 2015

(54) VEHICLE CONTROL DEVICE

(71) Applicants: ADVICS CO., LTD., Kariya (JP);
TOYOTA JIDOSHA KABUSHIKI KAISHA, Toyota (JP)

(72) Inventors: Takashi Watanabe, Nagoya (JP);
Shinsuke Yamamoto, Anjyo (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

(*) Notice: Subject to any disclaimer, the term of this patent is extended or adjusted under 35 U.S.C. 154(b) by 0 days.

(21) Appl. No.: 14/376,376

(22) PCT Filed: Feb. 1, 2013

(86) PCT No.: PCT/JP2013/052336
§ 371 (c)(1),
(2) Date: Aug. 1, 2014

(87) PCT Pub. No.: WO2013/115355
PCT Pub. Date: Aug. 8, 2013

(65) Prior Publication Data
US 2015/0006049 A1 Jan. 1, 2015

(30) Foreign Application Priority Data

Feb. 3, 2012 (JP) ................................ 2012-021809

(51) Int. Cl.
*G06F 17/00* (2006.01)
*B60K 17/35* (2006.01)
(Continued)

(52) U.S. Cl.
CPC ............ *B60K 17/35* (2013.01); *B60T 13/741* (2013.01); *B60T 17/18* (2013.01); *B60T 2201/14* (2013.01); *B60T 2270/402* (2013.01)

(58) Field of Classification Search
None
See application file for complete search history.

(56) References Cited

U.S. PATENT DOCUMENTS 7,328,955 B2 * 2/2008 Tsukasaki ..................... 303/190
7,393,065 B2 * 7/2008 Craig et al. ............... 303/122.09
(Continued)

FOREIGN PATENT DOCUMENTS

JP 2005-205975 A 8/2005
JP 2006-123797 A 5/2006
(Continued)

OTHER PUBLICATIONS

International Search Report (PCT/ISA/210) mailed on Apr. 16, 2013, by the Japanese Patent Office as the International Searching Authority for International Application No. PCT/JP2013/052336.

*Primary Examiner* — Dirk Wright
(74) *Attorney, Agent, or Firm* — Buchanan Ingersoll & Rooney PC

(57) ABSTRACT

A vehicle control device is applied to a vehicle having a driving mechanism for transmitting a driving force to a plurality of wheels, a braking mechanism having an electronic parking brake for generating a parking brake force for at least one of the plurality of wheels, and a coupling state control mechanism for controlling state of coupling of the plurality of wheels. The vehicle control device determines whether the electronic parking brake is in a lock stuck state in which the parking brake force cannot be canceled. When at least one of the plurality of wheels is in the lock stuck state, the vehicle control device exercises stuck state special control to loosen or cancel state of coupling between a wheel determined to be in the lock stuck state and a wheel determined to be not in the lock stuck state by controlling the coupling state control mechanism.

5 Claims, 9 Drawing Sheets

(51) Int. Cl.
*B60T 17/18* (2006.01)
*B60T 13/74* (2006.01)

(56) References Cited

U.S. PATENT DOCUMENTS

2005/0217952 A1  10/2005  Usui

2010/0101900 A1  4/2010  Usui

FOREIGN PATENT DOCUMENTS

| JP | 2010-058788 A | 3/2010 |
| JP | 2010-064569 A | 3/2010 |
| JP | 2010-069958 A | 4/2010 |
| JP | 2011-063104 A | 3/2011 |

* cited by examiner

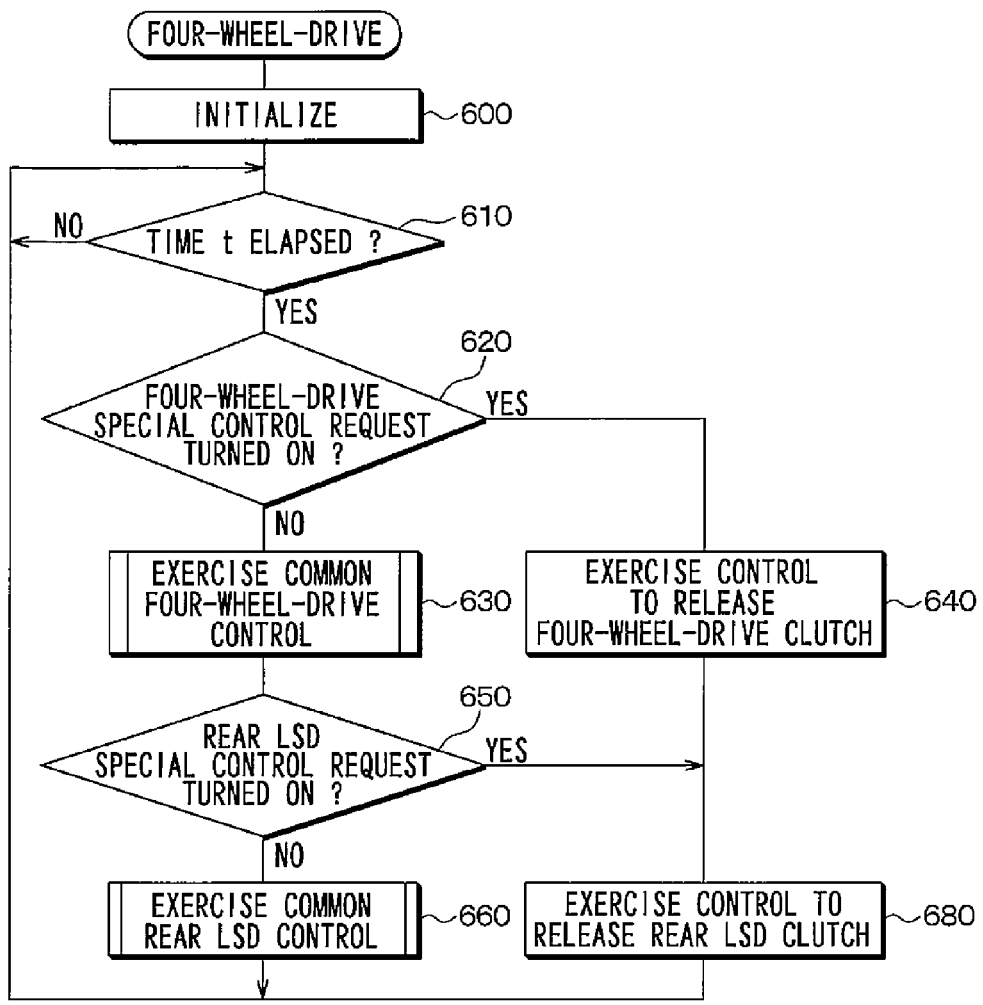

VEHICLE CONTROL DEVICE

TECHNICAL FIELD

The present invention relates to a vehicle control device that controls a vehicle having an electric parking brake (hereinafter referred to as the EPB).

BACKGROUND ART

The EPB has been used to restrain the movement of a parked vehicle. When the movement of a vehicle is to be restrained, the EPB is activated to exercise lock control in order to place the wheels of the vehicle in a locked state by pressing a brake pad or other friction material against a brake disc or other friction target material to generate a parking brake force. When the restraint on the movement of the vehicle is to be removed, the EPB is activated to exercise release control in order to release the friction material from the friction target material, thereby switching the status of the wheels from the locked state to a released state. As the EPB is capable of generating the parking brake force as described above, studies are conducted to variously exercise vehicle control by using the parking brake force.

However, if the EPB becomes faulty in the locked state while the vehicle is stopped, for instance, at an intersection so that the wheels cannot be released (this state will be hereinafter referred to as the EPB's stuck state or lock stuck state), traffic is obstructed. It is therefore preferred that the vehicle be capable of being moved to a roadside. As such being the case, proposed in PTL 1 is a technology that exercises release control to permit the vehicle to move in the event of a failure in which the EPB is stuck but the wheels are releasable.

CITATION LIST

Patent Literature

[PTL 1]
Japanese Patent Application Publication No. JP-A-2006-123797

SUMMARY OF INVENTION

Technical Problem

No problem arises as far as the wheels are releasable. However, if a motor for moving the vehicle fails to drive the friction material due, for instance, to a break in a motor circuit, the EPB is left stuck. Thus, the parking brake force generated by the EPB cannot be canceled. In this instance, the vehicle is moved by depressing an accelerator pedal so that the wheels to which the EPB is attached are dragged in the lock stuck state. However, if the rotation of any wheel is restrained, the movement of the vehicle may be obstructed.

For example, a four-wheel-drive vehicle is controlled so that the rotation speed of a front wheel shaft and the rotation speed of a rear wheel shaft are compared and kept at a predetermined ratio. Therefore, if the rotation of rear wheels to which the EPB is attached is restrained, the rotation of front wheels is also restrained. Thus, the movement of the vehicle is obstructed because no driving force is delivered. Further, if a limited-slip differential (hereinafter referred to as the LSD) is provided for a driving wheel to which the EPB is attached, one of left and right wheels does not rotate and obstructs the movement of the vehicle when the EPB for the remaining wheels is stuck. In other words, when the rotation of a wheel is restrained due to a stuck EPB, it may be impossible to move a vehicle having a control device that restrains the rotation of the remaining wheels as well.

As is obvious from the above, the above-described situation cannot be properly handled simply by exercising release control in the event of a failure in which the wheels may be released as described in PTL 1.

In light of the foregoing, it is an object of the present invention to provide a vehicle control device that is capable of moving a vehicle even if an EPB is stuck in a situation where the vehicle includes a control device that, when the rotation of a wheel is restrained due to the stuck EPB, restrains the rotation of the remaining wheels.

Solution to Problem

In order to achieve the above-described object, according to a first feature of the present invention, there is provided a vehicle control device that includes a fastened state control means (3) that controls the state of coupling of the plurality of wheels (FR-RL) by controlling the coupling state control mechanism (6, 7, 10, 10a); and a lock stuck state determination means (200-230, 500-530) that determines whether the electronic parking brake (12, 13) is in a lock stuck state in which the parking brake force cannot be canceled; wherein the fastened state control means (3) includes a stuck state special control means (340, 640) that, when the lock stuck state determination means (200-230, 500-530) determines that at least one of the plurality of wheels (FR-RL) is in the lock stuck state, exercises stuck state special control to loosen or cancel state of coupling between a wheel determined to be in the lock stuck state and a wheel determined to be not in the lock stuck state.

As described above, for a vehicle that, when the rotation of a wheel is restrained due to a stuck EPB (12, 13), restrains the rotation of the remaining wheels, stuck state special control is exercised after determining that the lock stuck state prevails due to the stuck EPB (12, 13). Hence, the restraint on the operation of each wheel (FR-RL) can be loosened or canceled. Thus, the influence of the lock stuck state on the parking brake force can be reduced. As a result, even when a wheel to which the parking brake force generated by the EPB (12, 13) is applied remains in the lock stuck state, a braking force derived from the lock stuck state is not easily transmitted to a wheel that is not in the lock stuck state. Therefore, a driving force is delivered to the wheel that is not in the lock stuck state. Consequently, the vehicle can be moved by using the wheel in a state other than the lock stuck state while the wheel in the lock stuck state is dragged.

For example, when at least one of the one or more front wheels (FR, FL) is in the lock stuck state and none of the one more rear wheels (RR, RL) is in the lock stuck state or when none of the one or more front wheels (FR, FL) is in the lock stuck state and at least one of the one or more rear wheels (RR, RL) is in the lock stuck state, the stuck state special control means (340) in the fastened state control means (3) exercises front-rear restraining force reduction control, as the stuck state special control, to loosen or cancel state of coupling between the one or more front wheels (FR, FL) and the one or more rear wheels (RR, RL).

As described above, front-rear restraining force reduction control is exercised to loosen or cancel state of coupling between the one or more front wheels (FR, FL) and the one or more rear wheels (RR, RL). This ensures that, for example, when rear wheels (RR, RL) are in the lock stuck state, the braking force derived from the lock stuck state is not easily transmitted to both front wheels (FR, FL) even if both rear wheels (RR, RL) to which the parking brake force generated by the EPB (12, 13) is applied are left in the lock stuck state. Therefore, the driving force is delivered to both front wheels (FR, FL). Consequently, the vehicle can be moved by the two front wheels (FR, FL) while both rear wheels (RR, RL) are dragged.

Further, when at least one of the front wheels (FR, FL) is in the lock stuck state and at least one of the front wheels (FR, FL) is not in the lock stuck state or when at least one of the rear wheels (RR, RL) is in the lock stuck state and at least one of the rear wheels (RR, RL) is not in the lock stuck state, the stuck state special control means (340) in the fastened state control means (3) exercises left-right restraining force reduction control, as the stuck state special control, to loosen or cancel state of coupling between the front wheel (FR, FL) in the lock stuck state and the front wheel (FR, FL) not in the lock stuck state or state of coupling between the rear wheel (RR, RL) in the lock stuck state and the rear wheel (RR, RL) not in the lock stuck state.

As described above, left-right restraining force reduction control is exercised to loosen or cancel the coupling between the front wheel (FR, FL) in the lock stuck state and the front wheel (FR, FL) in a state other than the lock stuck state or the coupling between the rear wheel (FR, FL) in the lock stuck state and the rear wheel (FR, FL) in a state other than the lock stuck state. If, for instance, only the EPB (12, 13) for a left or right wheel of a vehicle having the LSD is in the lock stuck state, the rotation of a left or right wheel that is not in the lock stuck state may be restrained to obstruct the movement of the vehicle. Therefore, when left-right restraining force reduction control is exercised, the restraint on the operation of the left and right wheels can be loosened or canceled. This reduces the influence of the lock stuck state on the parking brake force. Hence, the driving force can be easily delivered to the left or right wheel in a state other than the lock stuck state even if the remaining left or right wheel remains in the lock stuck state. Consequently, the vehicle can be moved while the left or right wheel in the lock stuck state is dragged.

According to a second feature of the present invention, there is provided the vehicle control device that includes a driving source control means (15). When the lock stuck state determination means (200-230, 500-530) determines that at least one of the plurality of wheels (FR-RL) is in the lock stuck state, the driving source control means (15) exercises driving force limiting control to limit the driving force to be generated from a driving source (1).

As described above, when driving force limiting control is exercised, it is possible to prevent pinion gears of various differentials from being damaged due to the application of excessive force. For example, driving force limiting control can be exercised to limit the maximum output value of the driving source (1) or limit the output change rate of the driving source (1).

The parenthesized reference numerals assigned to the above means exemplarily correspond to specific means described in conjunction with later-described embodiments.

BRIEF DESCRIPTION OF DRAWINGS

FIG. 10 is a flowchart illustrating in detail a four-wheel-drive control process that includes a four-wheel-drive special control process and a rear LSD special control process that are performed by the four-wheel-drive control ECU 3.

DESCRIPTION OF EMBODIMENTS

Figure 1:
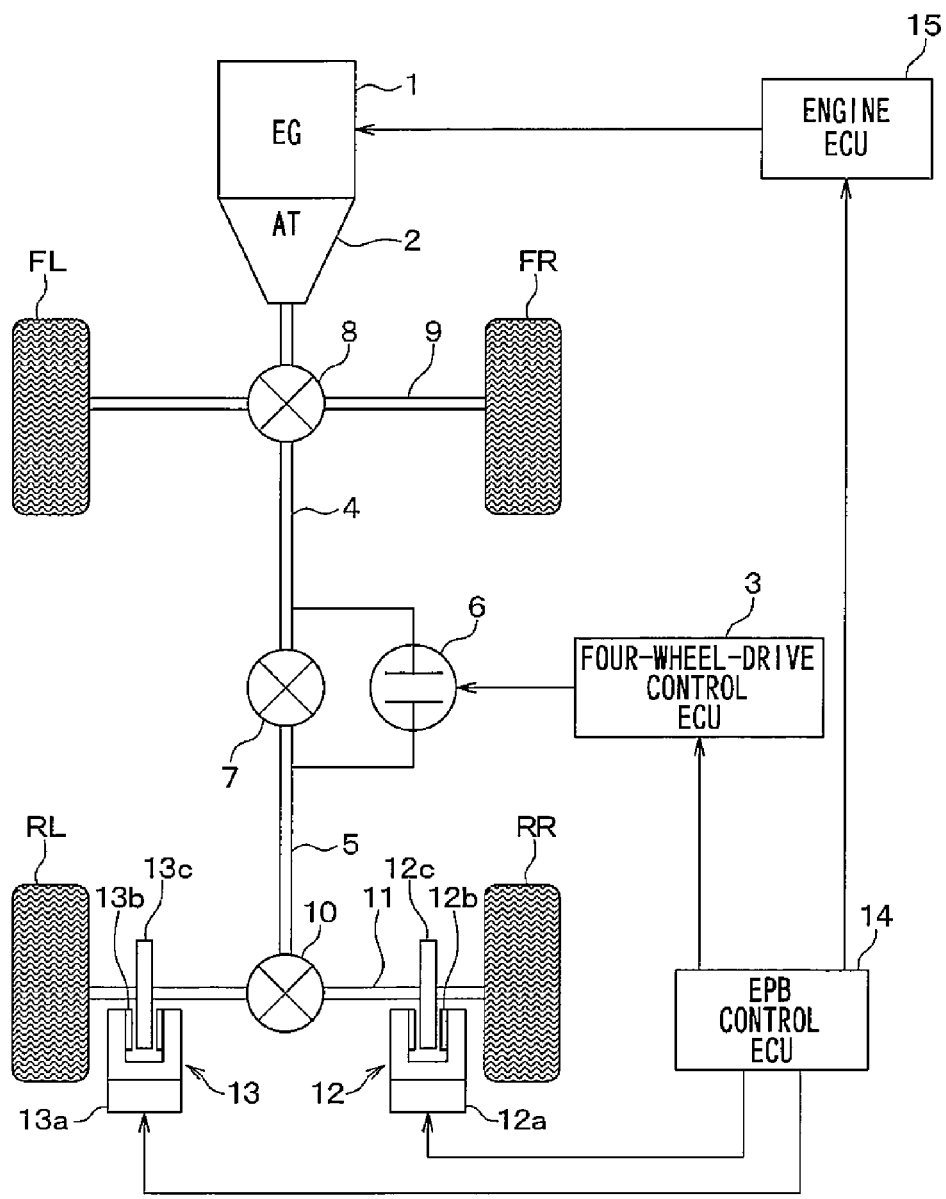
FIG. 1 is a diagram illustrating the system configuration of a center-differential four-wheel-drive vehicle to which a vehicle control device according to a first embodiment of the present invention is applied.

Embodiments of the present invention will now be described with reference to the accompanying drawings. In the following description of the embodiments, elements identical or equivalent to each other are designated by the same reference numerals.

First Embodiment

A first embodiment of the present invention will now be described. The first embodiment will be described on the assumption that a vehicle control device according to an embodiment of the present invention is applied to a center-differential four-wheel-drive vehicle.

FIG. 1 is a diagram illustrating the system configuration of a center-differential four-wheel-drive vehicle to which the vehicle control device is applied. This vehicle control device is applied to a four-wheel-drive vehicle whose front wheels FR, FL and rear wheels RR, RL act as driving wheels.

As shown in FIG. 1, an engine output (engine torque) generated by an engine 1 is transmitted to a transmission 2 such as an automatic transmission (AT) and converted at a gear ratio corresponding to a gear position selected in the transmission 2 so that a driving force is transmitted in a desired driving force proportion to front wheels FR, RL and rear wheels RR, RL.

More specifically, the driving force transmitted from the transmission 2 to a front propeller shaft 4 is transmitted to a rear propeller shaft 5 in a desired driving force proportion selected by a later-described four-wheel-drive control electronic control device (hereinafter referred to as the four-wheel-drive control ECU) 3.

In a four-wheel-drive vehicle, for example, the ratio (driving force proportion) between the driving force applied to the front wheels FR, FL and the driving force applied to the rear wheels RR, RL is variable within a predetermined range. More specifically, a clutch 6 controls the restraining force (state of coupling) of a center differential 7 provided for the joint between the front propeller shaft 4 and the rear propeller shaft 5 for the purpose of exercising control so that the driving force proportion is equal to a desired ratio within the predetermined range.

Hence, the driving force based on the driving force proportion for the front wheels is applied to the front wheels FR, FL through a front drive shaft 9 that is connected to the front propeller shaft 4 through a front differential 8. Further, the driving force based on the driving force proportion for the rear wheels is applied to the rear wheels RR, RL through a rear drive shaft 11 that is connected to the rear propeller shaft 5 through a rear differential 10.

In a four-wheel-drive vehicle in which driving force proportion control can be exercised as described above, EPBs 12, 13 are respectively provided for the rear wheels RR, RL. The EPBs 12, 13 are configured to independently generate a parking brake force for the rear wheels RR, RL and controlled by EPB control electronic control device (hereinafter referred to as the EPB control ECU) 14.

An EPB of any type may be used as the EPBs 12, 13 as far as it is electrically driven. In the present embodiment, it is assumed that the EPBs 12, 13 are of a disc brake type that generates the parking brake force by operating its motor 12a, 13a to press a brake pad 12b, 13b, which acts as a friction material, against a brake disc 12c, 13c, which acts as a friction target material. Alternatively, the EPBs 12, 13 may be of a drum brake type that generates the parking brake force by pressing a brake shoe, which acts as a friction material, against a brake drum, which acts as a friction target material.

The engine output of the engine 1 is controlled by an engine control electronic control device (hereinafter referred to as the engine ECU) 15. The engine ECU 15 exercises engine control in accordance with an accelerator operation performed by a driver of the vehicle.

The system configuration of the vehicle to which the vehicle control device according to the present embodiment is applied has been described above. The vehicle control device includes an EPB control ECU 14, a four-wheel-drive control ECU 3, and the engine ECU 15. These ECUs 3, 14, 15 exercise stuck state special control in order to make the vehicle mobile even when the EPBs 12, 13 are stuck.

Various control processes performed in the vehicle having the above-described system configuration by the four-wheel-drive control ECU 3, the EPB control ECU 14, and the engine ECU 15 will now be described.

The four-wheel-drive control ECU 3 corresponds to a fastened state control means, is formed of a well-known microcomputer having, for example, a CPU, a ROM, a RAM, and an I/O device, and exercises, for example, driving force proportion control in accordance with a program stored, for instance, in the ROM. More specifically, the four-wheel-drive control ECU 3 usually exercises common driving force proportion control. In the present embodiment, however, the four-wheel-drive control ECU 3 additionally exercises four-wheel-drive special control as stuck state special control when the EPBs 12, 13 are stuck. When the EPBs 12, 13 are stuck, the EPB control ECU 14 determines whether or not to exercise four-wheel-drive special control. When a four-wheel-drive special control request is input from the EPB control ECU 14, the four-wheel-drive ECU 3 exercises four-wheel-drive special control. Common driving force proportion control is well known and will not be described here.

The EPB control ECU 14 is also formed of a well-known microcomputer having, for example, a CPU, a ROM, a RAM, and an I/O device, and exercises, for example, common EPB control in accordance with a program stored, for instance, in the ROM. More specifically, the EPB control ECU 14 exercises common EPB control in accordance with an operation request of the EPBs 12, 13. Further, the EPB control ECU 14 performs a four-wheel-drive special control request determination process to determine whether it is necessary to exercise stuck state special control such as four-wheel-drive special control. In accordance with the result of the four-wheel-drive special control request determination process, the EPB control ECU 14 outputs a four-wheel-drive special control request to the four-wheel-drive control ECU 3.

Similarly, the engine ECU 15 is also formed of a well-known microcomputer having, for example, a CPU, a ROM, a RAM, and an I/O device, and exercises common engine control in accordance with a program stored, for instance, in the ROM. In the present embodiment, however, the engine ECU 15 additionally exercises driving force limiting control in order to prevent the differentials 7, 8, 10 from becoming faulty when the EPBs 12, 13 are stuck. The EPB control ECU 14 determines whether or not to exercise four-wheel-drive special control when the EPBs 12, 13 are stuck. Therefore, when it is determined that four-wheel-drive special control is to be exercised, that is, when a four-wheel-drive special control request is input from the EPB control ECU 14, the engine ECU 15 exercises driving force limiting control. Common engine control is well known and will not be described here.

A four-wheel-drive control process, which includes a control process performed by the EPB control ECU 14 and a four-wheel-drive special control process performed by the four-wheel-drive control ECU 3, and a driving force limiting control process, which is one of the processes performed by the engine ECU 15, will now be described.

Figure 2:
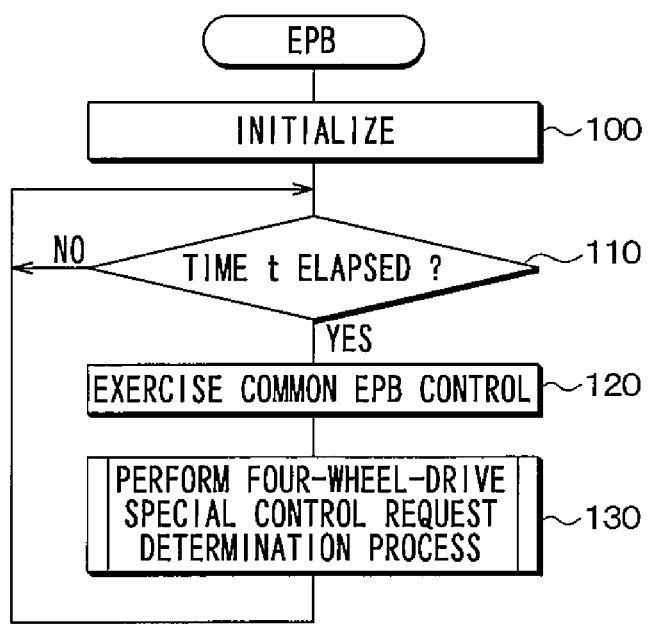
FIG. 2 is a flowchart illustrating in detail a control process that is performed by an EPB control ECU 14.

First of all, the control process performed by the EPB control ECU 14 will be described. FIG. 2 is a flowchart illustrating the details of the control process performed by the EPB control ECU 14. The process shown in FIG. 2 is performed when, for instance, an ignition switch is turned on.

First of all, an initialization process is performed in step 100, for example, to perform a flag reset and erase data in a memory. In this instance, an initial check is also performed, for instance, to determine whether current supply lines to the motors 12a, 13a are broken. The memory (not shown) stores the result of the check. Next, step 110 is performed to determine whether time t, which corresponds to a control cycle, has elapsed. Subsequently, steps 120 and 130 are performed at the beginning of the control cycle.

In step 120, a common EPB control process is performed. The common EPB control process is performed to exercise common EPB control in accordance with an operation request of the EPBs 12, 13. For example, lock control is exercised in accordance with a lock request to drive the motors 12a, 13a provided for the EPBs 12, 13 in order to generate a parking brake force by pressing the brake pads 12b, 13b against the brake discs 12c, 13c. When a desired parking brake force is generated, the drive of the motors 12a, 13a is stopped and the resulting state is maintained to place both rear wheels RR, RL in a locked state. Further, release control is exercised in accordance with a release request to rotate the motors 12a, 13a in a direction opposite the direction in which the motors 12a, 13a rotate during lock control. The brake pads 12b, 13b are then separated from the brake discs 12c, 13c to cancel the parking brake force. This switches both rear wheels RR, RL from the locked state to a released state and permits the vehicle to move without being affected by the parking brake force.

The EPB control ECU 14 obtains information about the status of the EPBs 12, 13 during lock control, during release control, and during a period after the end of such control. This makes it possible to determine whether the locked state or the released state prevails. The EPB control ECU 14 also obtains information about the parking brake force generated by the EPBs 12, 13. For example, as a motor current flowing to the motors 12a, 13a is proportional to the parking brake force, the EPB control ECU 14 obtains information about the parking brake force by monitoring the motor current. Further, if the EPBs 12, 13 are of a cable type that pulls a cable to generate the parking brake force, the tensile force of the cable is proportional to the parking brake force. In this instance, therefore, the EPB control ECU 14 obtains information about the parking brake force by monitoring the tensile force of the cable with a tension sensor or the like.

Figure 3:
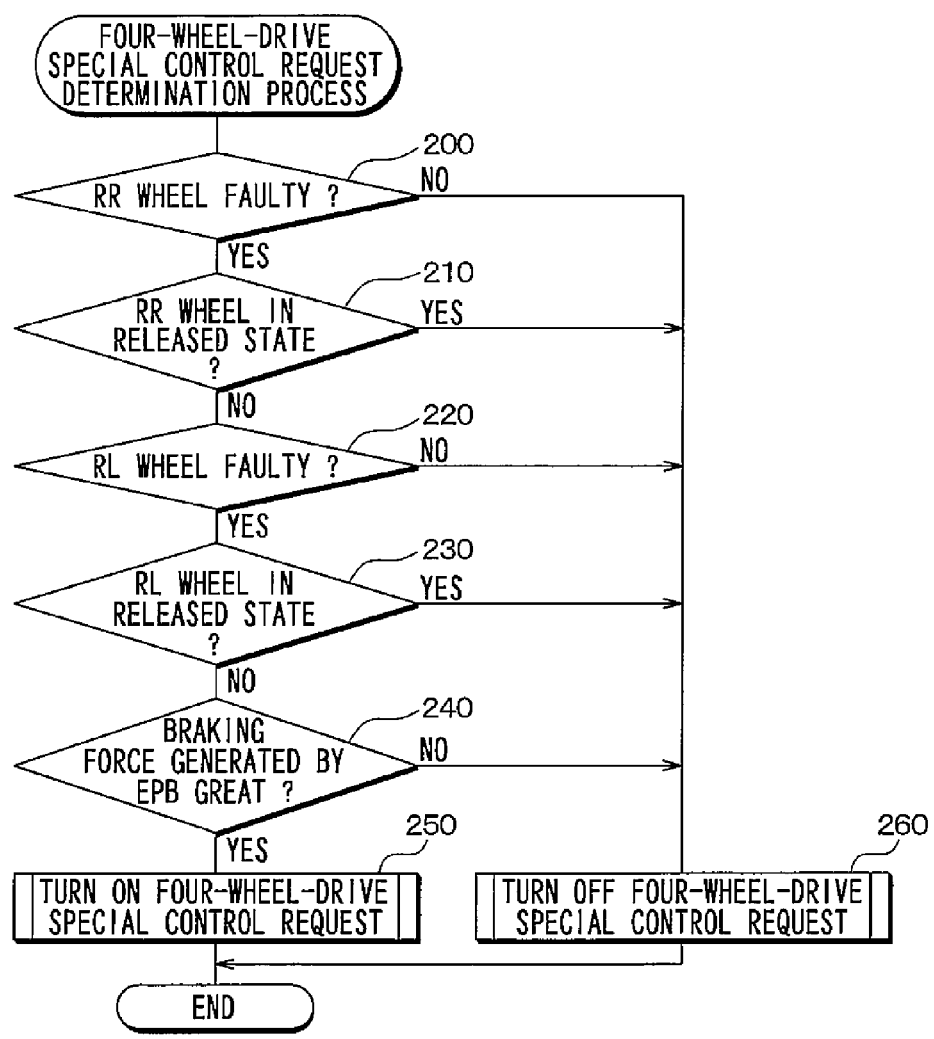
FIG. 3 is a flowchart illustrating in detail a four-wheel-drive special control request determination process.

In step 130, the four-wheel-drive special control request determination process is performed. The four-wheel-drive special control request determination process is performed to determine whether it is necessary to exercise four-wheel-drive special control as stuck state special control. FIG. 3 is a flowchart illustrating the details of the four-wheel-drive special control request determination process.

First of all, in steps 200 to 230, the rear wheels RR, RL are both checked to determine whether the EPBs 12, 13 are stuck and faulty, that is, whether the parking brake force cannot be canceled because a lock stuck state prevails. A four-wheel-drive vehicle is controlled so that the rotation speed of the front wheel shaft and the rotation speed of the rear wheel shaft are compared and kept at a predetermined ratio. Therefore, if the rotation of both rear wheels to which the EPBs 12, 13 are attached is restrained, the rotation of the front wheels FR, FL is also restrained to obstruct the movement of the vehicle. Therefore, the rear wheels RR, RL are both checked to detect that the EPBs 12, 13 are stuck and faulty.

More specifically, step 200 is performed to determine whether the right rear wheel RR is faulty. In step 120, common EPB control is exercised to perform a self-diagnostic check to determine whether the right rear wheel RR is faulty. Therefore, whether the right rear wheel RR is faulty can be determined by confirming the result of the self-diagnostic check. If the query in step 200 is answered "YES", processing proceeds to step 210.

Step 210 is performed to determine whether the right rear wheel RR is in the released state. The EPB control ECU 14 is capable of checking whether the individual wheels RR, RL are in the locked state or n the released state. Therefore, in step 210, whether the right rear wheel RR is in the released state is determined in accordance with the result of the check. If the right rear wheel RR is in the released state, the vehicle does not become immobile due to stuck EPBs 12, 13. If the query in step 210 is answered "NO", that is, if the EPBs 12, 13 are stuck to make the vehicle immobile because the lock stuck state prevails, processing proceeds to step 220.

Step 220 is performed, as is the case with step 200, to determine whether the left rear wheel RL is faulty. If the query in step 220 is answered "YES", processing proceeds to step 230. Step 230 is performed, as is the case with step 210, to determine whether the left rear wheel RL is in the released state. If the query in step 230 is answered "NO", processing proceeds to step 240. Step 240 is performed to determine whether the braking force (parking brake force) generated by the EPBs 12, 13 is great. This determination step is performed, for instance, to determine whether the parking brake force recognized by the EPB control ECU 14 is greater than a predetermined threshold value. More specifically, if the parking brake force is not so great, the vehicle can move because the driving force overcomes the braking force even when the driving force is distributed to the four wheels.

Hence, if the query in step 240 is answered "YES", processing proceeds to step 250. In step 250, the four-wheel-drive special control request is turned on because it is considered necessary to exercise four-wheel-drive special control as stuck state special control. This causes the EPB control ECU 14 to output a four-wheel-drive special control request to the four-wheel-drive control ECU 3. On the contrary, if the query in step 200, 220, or 240 is answered "NO" or if step 210 or 230 is answered "YES", the four-wheel-drive special control request is turned off because it is considered unnecessary to exercise four-wheel-drive special control. In the above-described manner, the four-wheel-drive special control request determination process is completed to conclude the control process performed by the EPB control ECU 14.

Figure 4:
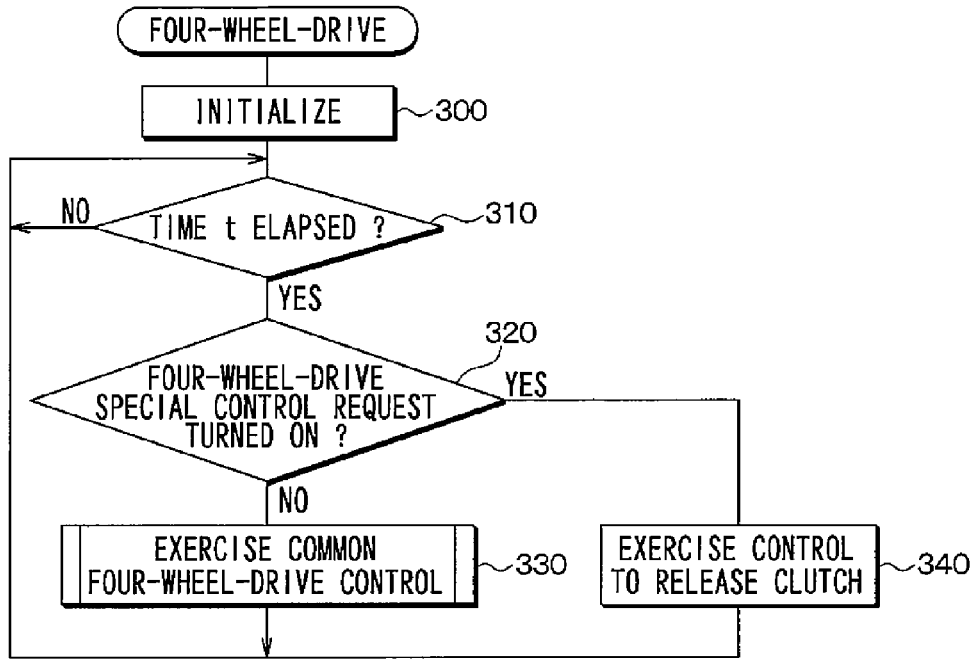
FIG. 4 is a flowchart illustrating in detail a four-wheel-drive control process that includes a stuck state special control process performed by a four-wheel-drive control ECU 3.

A four-wheel-drive control process including a stuck state special control process performed by the four-wheel-drive control ECU 3 will now be described. FIG. 4 is a flowchart illustrating the details of the four-wheel-drive control process including the stuck state special control process performed by the four-wheel-drive control ECU 3. The process shown in FIG. 4 is also performed when, for instance, the ignition switch is turned on.

First of all, the initialization process is performed in step 300, for example, to perform a flag reset and erase data in the memory. Next, step 310 is performed to determine whether time t, which corresponds to the control cycle, has elapsed. Subsequently, steps 320 and beyond are performed at the beginning of the control cycle.

Step 320 is performed to determine in accordance with the result of four-wheel-drive special control request determination whether the four-wheel-drive special control request is turned on. More specifically, the query in step 320 is answered "YES" if the four-wheel-drive special control request is on in step 250 or answered "NO" if the four-wheel-drive special control request is turned off in step 260.

If the query in step 320 is answered "NO", the vehicle is not immobile due to stuck EPBs 12, 13; therefore, processing proceeds to step 330 for the purpose of exercising common four-wheel-drive control, that is, common driving force proportion control. If the query in step 320 is answered "YES", the vehicle may become immobile due to stuck EPBs 12, 13; therefore, processing proceeds to step 340 for the purpose of exercising clutch release control. In the present embodiment, control exercised in step 340 corresponds to front-rear restraining force reduction control according to the present invention.

More specifically, control is exercised so that the clutch 6 loosens or cancels the restraining force of the center differential 7, which is provided for the joint between the front propeller shaft 4 and the rear propeller shaft 5. In other words, the driving force proportion for the rear wheels RR, RL is made smaller than the ratio set during common four-wheel-drive control and preferably reduced to zero in order to loosen or cancel the state of coupling of the center differential 7. This makes it possible to loosen or cancel the restraint on the operation of the front and rear wheels FR-RL. Thus, the influence of the lock stuck state on the parking brake force can be reduced. Hence, the driving force can be easily delivered to both front wheels FR, FL even when both rear wheels RR, RL to which the parking brake force generated by the EFBs 12, 13 is applied are left in the lock stuck state. Consequently, the vehicle can be moved by the two front wheels FR, FL while both rear wheels RR, RL are dragged. In the above-described manner, the four-wheel-drive control ECU 3 completes the four-wheel-drive control process.

Figure 5:
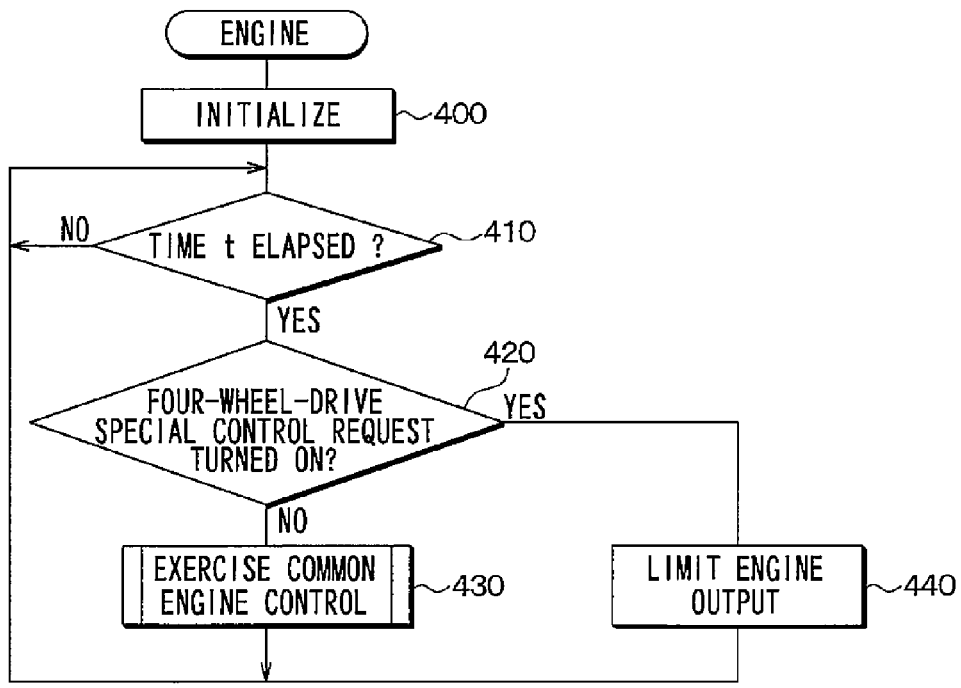
FIG. 5 is a flowchart illustrating in detail an engine control process that is performed by an engine ECU 15.

An engine control process performed by the engine ECU 15 will now be described. FIG. 5 is a flowchart illustrating the details of the engine control process performed by the engine ECU 3. The process shown in FIG. 5 is also performed when, for instance, the ignition switch is turned on.

First of all, the initialization process is performed in step 400, for example, to perform a flag reset and erase data in the memory. Next, step 410 is performed to determine whether time t, which corresponds to the control cycle, has elapsed.

Subsequently, steps 420 and beyond are performed at the beginning of the control cycle.

Step 420 is performed to determine in accordance with the result of four-wheel-drive special control request determination whether the four-wheel-drive special control request is turned on. More specifically, the query in step 420 is answered "YES" if the four-wheel-drive special control request is on in step 250 or answered NO if the four-wheel-drive special control request is turned off in step 260.

If the query in step 420 is answered "NO", the vehicle is not immobile due to stuck EPBs 12, 13; therefore, processing proceeds to step 430 for the purpose of exercising common engine control, that is, exercising, for example, engine output control in accordance with a common accelerator operation performed by the driver. If the query in step 420 is answered "YES", the vehicle may become immobile due to stuck EPBs 12, 13; therefore, processing proceeds to step 440 for the purpose of exercising engine output limiting control, which corresponds to driving force limiting control.

Engine output limiting control is exercised in order to prevent the differentials 7, 8, 10 from becoming faulty, as mentioned earlier. For example, each differential is formed of bevel gears. Each differential includes a ring gear, a pinion gear, and a frame. The ring gear includes a side gear formed of a bevel gear disposed on its end face. The pinion gear includes a bevel gear. The frame includes a side gear formed of a bevel gear. The side gear of the ring gear meshes with the side gear of the frame through the pinion gear. In the above-described gear configuration, the pinion gear is smaller than the ring gear because the pinion gear rotates together with the frame. Hence, if a high driving torque is applied while a wheel on one side is fixed, force concentration occurs at a contact between pinion gear teeth and side gear teeth, thereby damaging the pinion gear (resulting in the loss of gear teeth).

Consequently, limiting the driving force by exercising engine output limiting control, that is, for example, limiting the maximum output value and output change rate of the engine output, makes it possible to reduce the engine output, thereby preventing the pinion gear from being subjected to an excessive force and damaged. More specifically, control should be exercised to limit the amount of engine torque and suppress a sudden increase in torque. The engine control process performed by the engine ECU 15 is completed in the above-described manner.

As described above, as for a four-wheel-drive vehicle in which, when the rotation of the wheels RR, RL is restrained due to stuck EPBs 12, 13, the rotation of the other wheels FR, FL is also restrained, the present embodiment concludes that the lock stuck state prevails due to stuck EPBs 12, 13, and exercises four-wheel-drive special control as stuck state special control.

In other words, the four-wheel-drive control ECU 3 exercises control so that the clutch 6 loosens or cancels the restraining force of the center differential 7, which is provided for the joint between the front propeller shaft 4 and the rear propeller shaft 5. This makes it possible to loosen or cancel the restraint on the operation of the front and rear wheels FR-RL and reduce the influence of the lock stuck state on the parking brake force. Hence, the driving force can be easily delivered to both front wheels FR, FL even when both rear wheels RR, RL to which the parking brake force generated by the EPBs 12, 13 is applied are left in the lock stuck state. Consequently, the vehicle can be moved by the two front wheels FR, FL while both rear wheels RR, RL are dragged.

Further, the engine ECU 15 exercises engine output reduction control as driving force limiting control. This prevents the pinion gears of the differentials 7, 8, 10 from being subjected to an excessive force and damaged.

Modification of First Embodiment

The first embodiment has been described on the assumption that the vehicle control device according to an embodiment of the present invention is applied to a center-differential four-wheel-drive vehicle. However, an embodiment of the present invention is also applicable to a center-clutch four-wheel-drive vehicle.

Figure 6:
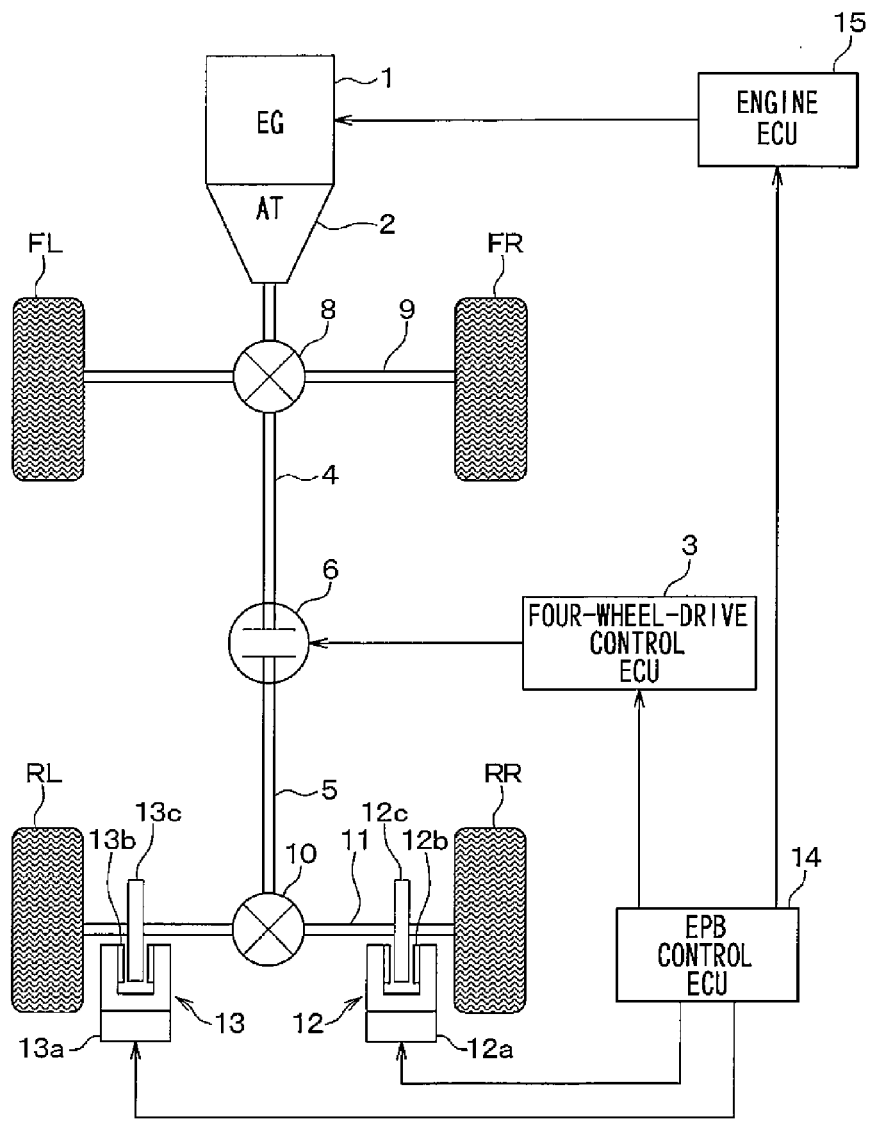
FIG. 6 is a diagram illustrating the system configuration of a center-clutch four-wheel-drive vehicle to which the vehicle control device according to a modification of the first embodiment is applied.

FIG. 6 is a diagram illustrating the system configuration of a center-clutch four-wheel-drive vehicle to which the vehicle control device is applied. As shown in FIG. 6, the center-clutch four-wheel-drive vehicle controls the restraining force of the front propeller shaft 4 and rear propeller shaft 5 by controlling the restraining force of the clutch 6 for the purpose of exercising control so that the driving force proportion is equal to a desired ratio within the predetermined range.

In the above-described center-clutch four-wheel-drive vehicle, control is exercised to loosen the restraining force of the clutch 6 when four-wheel-drive special control is exercised as stuck state special control. In other words, the restraining force of the clutch 6 is loosened until the driving force proportion for the rear wheels RR, RL is smaller than the ratio set during common four-wheel-drive control and preferably reduced to zero. Even if control is exercised in the above-described manner, it is possible to loosen the restraint on the operation of the front and rear wheels FR-RL and reduce the influence of the lock stuck state on the parking brake force. Hence, the driving force can be easily delivered to both front wheels FR, FL even when both rear wheels RR, RL to which the parking brake force generated by the EPBs 12, 13 is applied are left in the lock stuck state. Consequently, the vehicle can be moved by the two front wheels FR, FL while both rear wheels RR, RL are dragged.

Second Embodiment

A second embodiment of the present invention will now be described. The second embodiment differs from the first embodiment in that the former is applicable to a four-wheel-drive vehicle having a rear LSD. In the other respects, the second embodiment is the same as the first embodiment. Therefore, only the differences from the first embodiment will be described.

Figure 7:
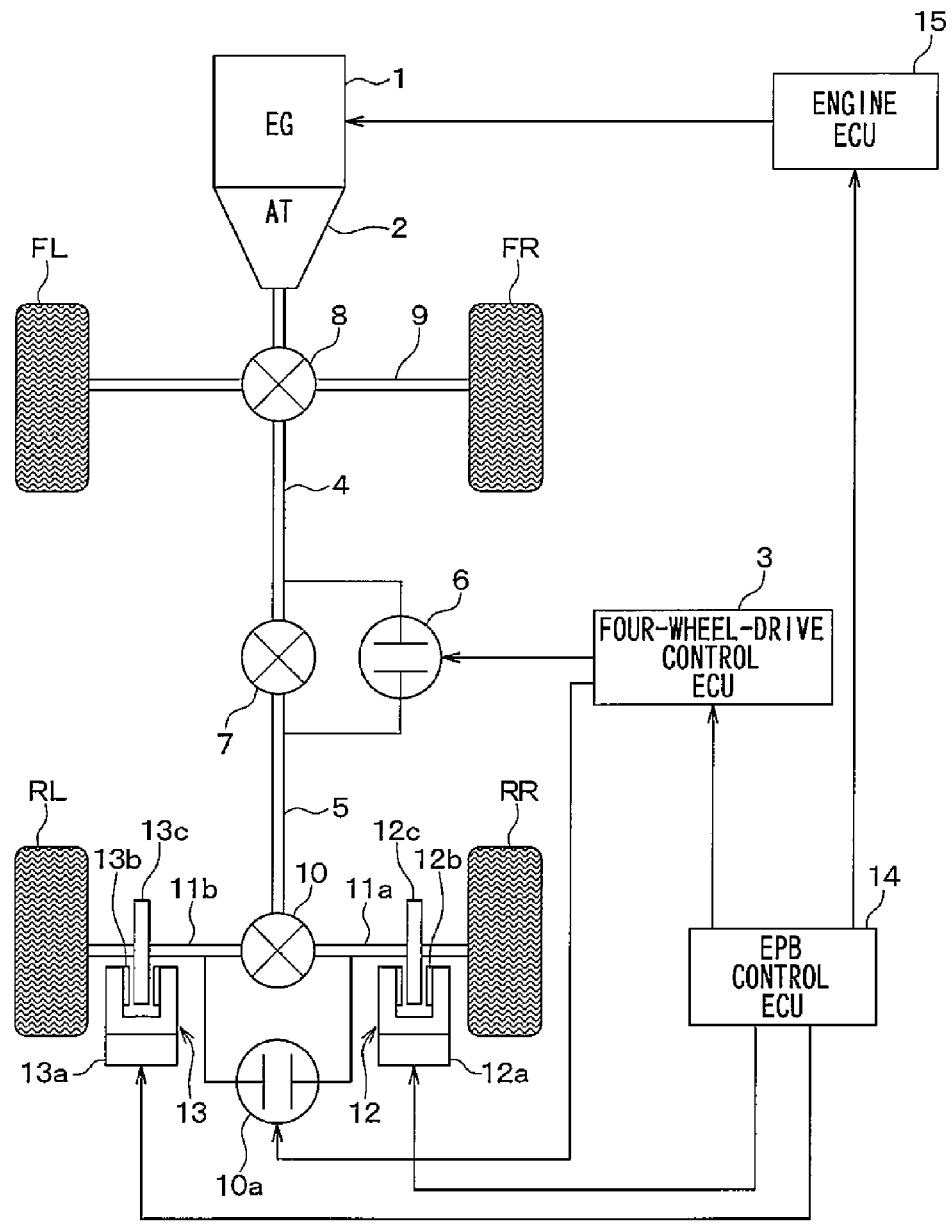
FIG. 7 is a diagram illustrating the system configuration of a four-wheel-drive vehicle having a rear LSD to which the vehicle control device according to a second embodiment of the present invention is applied.

FIG. 7 is a diagram illustrating the system configuration of a four-wheel-drive vehicle having a rear LSD to which the vehicle control device is applied. As shown in FIG. 7, the rear drive shaft 1 is divided into a right wheel shaft 11a and a left wheel shaft 11b, and the restraining force of the rear differential 10, which is provided for the joint between the right wheel shaft 11a and the left wheel shaft 11b, is controlled by a clutch 10a in order to control the driving force proportion between the rear wheels RR, RL. More specifically, the four-wheel-drive control ECU 3 controls the driving force proportion between the rear wheels RR, RL by exercising control so that the rotation speeds of the right wheel shaft 11a and left wheel shaft 11b are compared and kept at a predetermined ratio. In this manner, the driving force proportion is adjusted to limit the slip between the right rear wheel RR and the left rear wheel RL. The other elements of the second embodiment are the same as those of the first embodiment.

If only one the EPBs 12, 13 for the rear wheels RR, RL of the vehicle having the rear LSD is placed in the lock stuck state, the rotation of the remaining wheel in a state other than the lock stuck state may be restrained to obstruct the movement of the vehicle. For the vehicle having the rear LSD, therefore, rear LSD special control is exercised as stuck state special control.

A control process performed with respect to the four-wheel-drive vehicle having the rear LSD, which is configured as described above, will now be described. However, the engine control process including the driving force limiting control exercised by the engine ECU 15 is the same as described in conjunction with the first embodiment. Therefore, the following description only deals with a control process performed by the EPB control ECU 14 and a four-wheel-drive control process performed by the four-wheel-drive control ECU 3, which includes the four-wheel-drive special control process and a rear LSD special control process.

Figure 8:
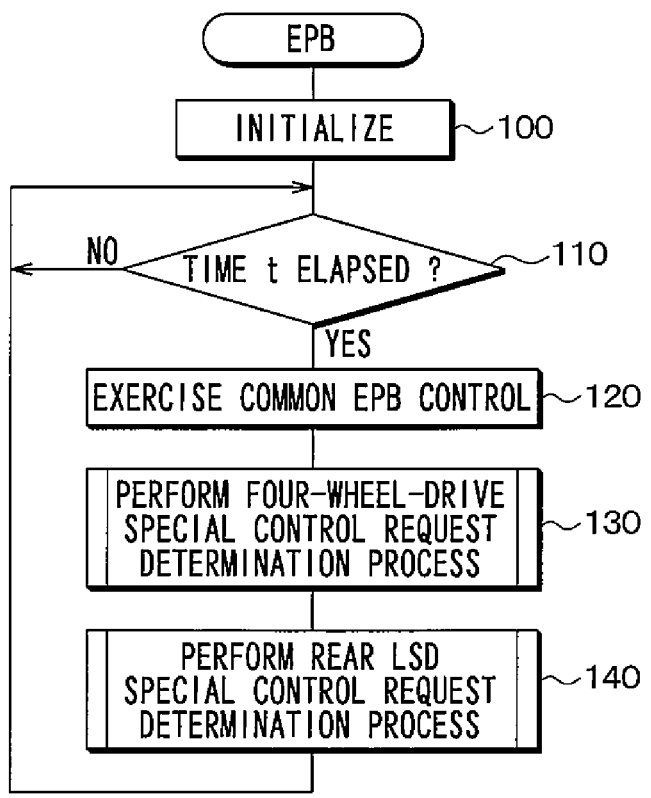
FIG. 8 is a flowchart illustrating in detail a control process that is performed by the EPB control ECU 14.
Figure 9:
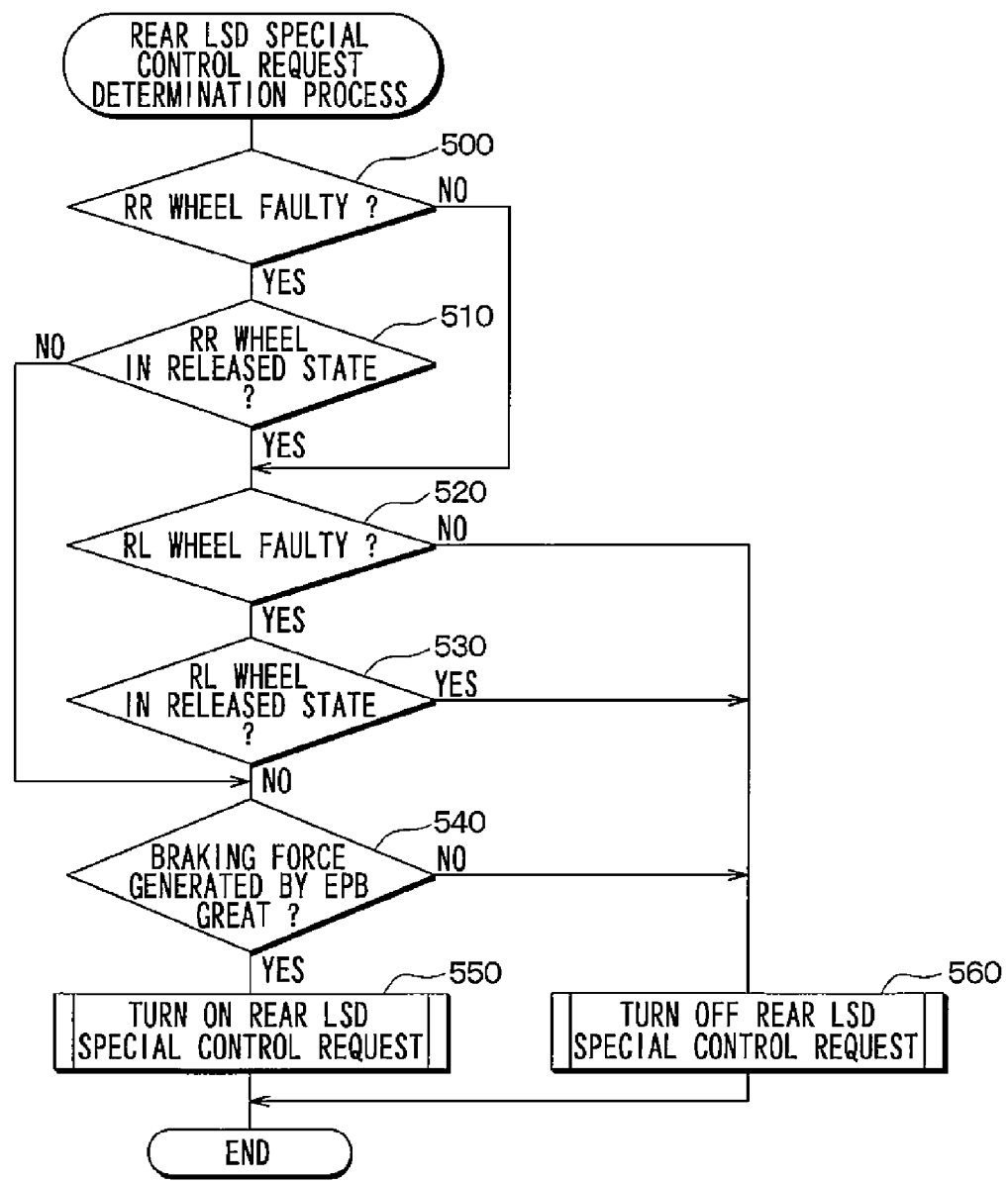
FIG. 9 is a flowchart illustrating in detail a rear LSD special control determination process.

FIG. 8 is a flowchart illustrating the details of the control process performed by the EPB control ECU 14. As is obvious from FIG. 8, steps 100 to 130 are the same as those in the first embodiment, which is depicted in FIG. 2. Upon completion of step 130, processing proceeds to step 140. In step 140, a rear LSD special control request determination process is performed. FIG. 9 is a flowchart illustrating the details of the rear LSD special control request determination process.

First of all, in steps 500 to 540, the same determination process as the four-wheel-drive special control request determination process is performed (refer to steps 200 to 240 of FIG. 3). However, steps 500 to 540 are performed to determine whether the rotation of only one of the rear wheels RR, RL is restrained due to a stuck EPB 12, 13.

Consequently; processing proceeds to step 540 only when the query in step 510 is answered NO after the query in step 500 is answered "YES" or when the query in step 530 is answered "NO" after the query in step 520 is answered "YES". In step 540, a rear wheel RR, RL that is determined in steps 500 to 530 to be faulty and not in the released state is checked to determine whether the braking force (parking brake force) applied by the EPB 12, 13 is great. If the query in step 540 is answered "YES", processing proceeds to step 550. In step 550, a rear LSD special control request is turned on because it is considered necessary to exercise rear LSD special control. This causes the FPB control ECU 14 to output the rear LSD special control request to the four-wheel-drive control ECU 3. On the contrary, if the query in step 520 or 540 is answered "NO" or if the query in step 530 is answered "YES", the rear LSD special control request is turned off because it is considered unnecessary to exercise rear LSD special control. In the above-described manner, the rear LSD special control request determination process is completed to conclude the control process performed by the EPB control ECU 14.

A four-wheel-drive control process including the four-wheel-drive special control process and the rear LSD special control process performed by the four-wheel-drive control ECU 3 will now be described. FIG. 10 is a flowchart illustrating the details of the four-wheel-drive control process including the four-wheel-drive special control process and the rear LSD special control process performed by the four-wheel-drive control ECU 3.

First of all, in steps 600 to 640, the same process is performed as in steps 300 to 340 of FIG. 4, which depicts the first embodiment. Upon completion of step 630 in which a common four-wheel-drive control process is performed, processing proceeds to step 650. Step 650 is performed to determine in accordance with the result of rear LSD special control request determination whether the rear LSD special control request is turned on. More specifically, the query in step 650 is answered "YES" if the rear LSD special control request is turned on in step 550 and answered NO if the rear LSD special control request is turned off in step 560.

If the query in step 650 is answered "NO", the vehicle is not immobile due to a stuck EPB 12, 13 for one of the rear wheels RR, RL; therefore, processing proceeds to step 660 for the purpose of exercising common rear LSD control, that is, exercising generally provided LSD control. If the query in step 650 is answered "YES", the vehicle may become immobile due to a stuck EPB 12, 13 for one of the rear wheels RR, RL; therefore, processing proceeds to step 670 for the purpose of exercising rear LSD clutch release control. In the present embodiment, the process performed in step 670 corresponds to left-right restraining force reduction control according to the present invention.

More specifically, control is exercised so that the clutch 10a loosens or cancels the restraining force of the rear differential 10, which is provided for the joint between the right wheel shaft 11a and the left wheel shaft 11b. In other words, the driving force proportion is reduced until the ratio for a stuck rear wheel RR, RL is made smaller than the ratio set during common LSD control or preferably the driving force proportion for a stuck rear wheel is reduced to zero in order to loosen or cancel the state of coupling of the rear differential 10. This makes it possible to loosen or cancel the restraint on the operation of the rear wheels RR, RL. Thus, the influence of the lock stuck state on the parking brake force can be reduced. Hence, even when a stuck rear wheel RR, RL is left in the lock stuck state, the driving force can be easily delivered to both front wheels FR, FL and to a rear wheel RR, RL that is not stuck. Consequently, the vehicle can be moved by three wheels, that is, the two front wheels FR, FL and one rear wheel RR, RL that is not stuck, while a stuck rear wheel RR, RL is dragged. In the above-described manner, the four-wheel-drive control ECU 3 completes the four-wheel-drive control process.

As described above, when the EPBs 12, 13 for the rear wheels RR, RL of a four-wheel-drive vehicle having the rear LSD are stuck, control is exercised to loosen or cancel the restraining force of the center differential 7, which is provided for the joint between the front propeller shaft 4 and the rear propeller shaft 5. This makes it possible to loosen or cancel the restraint on the operation of the front and rear wheels FR-RL and reduce the influence of the lock stuck state on the parking brake force. Hence, the driving force can be easily delivered to both front wheels FR, FL even when both rear wheels RR, RL to which the parking brake force generated by the EPBs 12, 13 is applied are left in the lock stuck state. Consequently, the vehicle can be moved by the two front wheels FR, FL while both rear wheels RR, RL are dragged.

Further, when only one of the EPBs 12, 13 for the rear wheels RR, RL is stuck, control is exercised to loosen or cancel the restraining force of the center differential 7, which is provided for the joint between the right wheel shaft 11a and the left wheel shaft 11b. This makes it possible to loosen or cancel the restraint on the operation of the rear wheels RR, RL. Thus, the influence of the lock stuck state on the parking brake force can be reduced. Hence, even when one of the rear wheels RR, RL is left in the lock stuck state, the driving force can be easily delivered to both front wheels FR, FL and to a rear wheel RR, RL that is not in the lock stuck state. Consequently, the vehicle can be moved by three wheels, that is, the two front wheels FR, FL and one rear wheel RR, RL that is not in the lock stuck state, while a rear wheel RR, RL in the lock stuck state is dragged.

Other Embodiments

The foregoing embodiments have been described with reference to an exemplary vehicle having the system configuration to which the present invention is applied. However, the vehicle control device according to the present invention is also applicable to a vehicle having a different configuration.

The foregoing embodiments have been described with reference to a four-wheel-drive vehicle. However, the vehicle control device according to the present invention is also applicable, for example, to a vehicle having a control device that, when the rotation of a wheel is restrained due to a stuck EPB 12, 13, restrains the rotation of the other wheels.

More specifically, if an EPB 12, 13 for one of the rear wheels RR, RL is stuck in a situation where an LSD is provided for the rear wheels RR, RL of a rear-drive vehicle, the rotation of the remaining rear wheel may be restrained to make the vehicle immobile. Even in such an instance, the vehicle can be moved, as is the case with the second embodiment, by exercising control to loosen or cancel the restraining force of the rear differential 10, which is provided for the joint between the right wheel shaft 11a and the left wheel shaft 11b, when only one of the EPBs 12, 13 for the rear wheels RR, RL is stuck.

Further, it is generally preferred that EPBs be provided for non-steering wheels. Therefore, the foregoing embodiments have been described on the assumption that the EPBs 12, 13 are provided for the rear wheels RR, RL. However, the present invention is applicable no matter whether the EPBs are provided for steering wheels or for non-steering wheels. Obviously, the rear wheels RR, RL of a special vehicle, such as a lift vehicle, may be used as steering wheels. In such an instance, it is conceivable that the EPBs are provided for the front wheels FR, FL. When a front LSD is provided for such a special vehicle, the same advantages can be obtained as in the second embodiment as far as front LSD special control is exercised in the same manner as the rear LSD special control according to the second embodiment.

Furthermore, although the engine 1 is cited as an example of a driving source that generates vehicle driving force, an electric motor or other driving source may be used. Moreover, although the transmission 2, the propeller shafts 4, 5, and the drive shafts 9, 11 are cited as examples of a driving mechanism that transmits the driving force, a driving mechanism different from those described in conjunction with the foregoing embodiments may be used. Besides, although the center differential 7, the rear differential 10, and the clutches 6, 10a are cited as examples of a coupling state control mechanism that controls the state of coupling of each wheel, a different mechanism may be used as the coupling state control mechanism.

In other words, the control device according to the present invention can be applied to a vehicle that has a driving source, a driving mechanism for transmitting the driving force of the driving source to a plurality of wheels, a braking mechanism for braking at least one (i.e. a subset or all) of the plurality of wheels, and a coupling state control mechanism for controlling the state of coupling of each wheel.

Further, the foregoing embodiments are configured so that the EPB control ECU 14, the four-wheel-drive control ECU 3, and the engine ECU 15 are parts of the vehicle control device according to the foregoing embodiments. However, such a configuration is merely an example, and they may be configured by a single electronic control unit (ECU). In other words, an electronic control unit having a fastened state control means for controlling a mechanism that controls the state of coupling of each wheel of the vehicle, a lock stuck state determination means, and a stuck state special control means may alternatively be used.

The steps depicted in various figures correspond to means for performing various processes. More specifically, a means for performing the process described in steps 200 to 230 of FIG. 3 and in steps 500 to 530 of FIG. 9 corresponds to the lock stuck state determination means; and a means for performing the process described in step 340 of FIG. 4 and in step 640 of FIG. 10 corresponds to the stuck state special control means,

DESCRIPTION OF REFERENCE NUMERALS

1 ... Engine
2 ... Transmission
3 ... Four-wheel-drive control ECU
4 ... Front propeller shaft
5 ... Rear propeller shaft
6 ... Clutch
7 ... Center differential
8 ... Front differential
9 ... Front drive shaft
10 ... Rear differential
10a ... Clutch
11 ... Rear drive shaft
11a ... Right wheel shaft
11b ... Left wheel shaft
12, 13 ... EPB
14 ... EPB control ECU
15 ... Engine ECU

The invention claimed is:

1. A vehicle control device that is applied to a vehicle having a driving source for generating a driving force for the vehicle, a driving mechanism for transmitting the driving force of the driving source to a plurality of wheels, a braking mechanism having an electronic parking brake for generating a parking brake force for at least one of the plurality of wheels, and a coupling state control mechanism for controlling state of coupling of the plurality of wheels, the vehicle control device comprising:
   a fastened state control means that controls the state of coupling of the plurality of wheels by controlling the coupling state control mechanism; and
   a lock stuck state determination means that determines whether the electronic parking brake is in a lock stuck state in which the parking brake force cannot be canceled;
   wherein the fastened state control means includes a stuck state special control means that, when the lock stuck state determination means determines that at least one of the plurality of wheels is in the lock stuck state, exercises stuck state special control to loosen or cancel state of coupling between a wheel determined to be in the lock stuck state and a wheel determined to be not in the lock stuck state.

2. The vehicle control device according to claim 1, wherein:
   the plurality of wheels include one or more front wheels and one or more rear wheels; and,
   when at least one of the one or more front wheels is in the lock stuck state and none of the one or more rear wheels is in the lock stuck state or when none of the one or more front wheels is in the lock stuck state and at least one of the one or more rear wheels is in the lock stuck state, the stuck state special control means in the fastened state control means exercises front-rear restraining force reduction control, as the stuck state special control, to loosen or cancel state of coupling between the one or more front wheels and the one or more rear wheels.

3. The vehicle control device according to claim 1, wherein:

the plurality of wheels include front wheels and rear wheels; and when at least one of the front wheels is in the lock stuck state and at least one of the front wheels is not in the lock stuck state or when at least one of the rear wheels is in the lock stuck state and at least one of the rear wheels is not in the lock stuck state, the stuck state special control means in the fastened state control means exercises left-right restraining force reduction control, as the stuck state special control, to loosen or cancel state of coupling between the front wheel in the lock stuck state and the front wheel not in the lock stuck state or state of coupling between the rear wheel in the lock stuck state and the rear wheel not in the lock stuck state.

4. The vehicle control device according to claim 1, further comprising:

a driving source control means that controls the driving force generated by the driving source;

wherein, when the lock stuck state determination means determines that at least one of the plurality of wheels is in the lock stuck state, the driving source control means exercises driving force limiting control to limit the driving force to be generated from the driving source.

5. The vehicle control device according to claim 4, wherein the driving source control means exercises the driving force limiting control to limit the maximum output value of the driving source or limit the output change rate of the driving source.

* * * * *